United States Patent [19]

Deloprato et al.

[11] Patent Number: 5,158,757
[45] Date of Patent: Oct. 27, 1992

[54] SYNTHESIS OF GALLOSILICATE ZEOLITES HAVING FAUJASITE STRUCTURE

[75] Inventors: Francois Deloprato, Riedisheim; Jean-Louis Guth, Brunstatt; Catherine Zivkov, Narosse, all of France

[73] Assignee: Societe Nationale Elf Aquitaine, Courbevoie, France

[21] Appl. No.: 671,704

[22] PCT Filed: Aug. 1, 1990

[86] PCT No.: PCT/FR90/00583
  § 371 Date: Apr. 1, 1991
  § 102(e) Date: Apr. 1, 1991

[87] PCT Pub. No.: WO91/01940
  PCT Pub. Date: Feb. 21, 1991

[30] Foreign Application Priority Data

Aug. 2, 1989 [FR] France ............................... 89 10425

[51] Int. Cl.$^5$ ............................................. C01B 33/34
[52] U.S. Cl. .................................................... 423/709
[58] Field of Search ............... 423/328, 326, 329, 118; 502/62

[56] References Cited

U.S. PATENT DOCUMENTS

| | | | |
|---|---|---|---|
| 3,306,922 | 2/1967 | Barrer et al. | 423/328 |
| 3,431,219 | 3/1969 | Argauer | 502/61 |
| 4,803,060 | 2/1989 | Ocelli | 502/61 |

*Primary Examiner*—R. Bruce Breneman
*Attorney, Agent, or Firm*—Burgess, Ryan & Wayne

[57] ABSTRACT

Disclosed is a process for the preparation of zeolites having a gallosilicate skeleton and belonging to the structural class of faujasite in which there is first formed a precursor of the zeolite which entraps a structuring agent which is thereafter destroyed by calcining wherein the structuring agent is at least one compound belonging to the group formed by carbon-containing rings and macrocycles whose ring comprises at least 6 atoms and contains heteroatoms selected from oxygen, nitrogen and silicon.

35 Claims, No Drawings

SYNTHESIS OF GALLOSILICATE ZEOLITES HAVING FAUJASITE STRUCTURE

BACKGROUND OF THE INVENTION

Zeolites are crystallised tectosilicates. Their structures are composed of assemblies of $TO_4$ tetrahedra which form a three-dimensional network by joining the oxygen atoms. In zeolites of the gallosilicate type, T represents tetravalent silicon and trivalent gallium. The abovementioned three-dimensional network has cavities and channels which are of molecular dimensions and take up cations for compensating the charge deficit owing to the presence of trivalent gallium in the $TO_4$ tetrahedra, said cations being in general exchangeable.

In general, the compositon of the zeolites can be represented by the empirical formula $(M_{2/n}O, Y_2O_3, xZO_2)$ in the dehydrated and calcined state. In this formula, Z and Y respectively denote the tetravalent and trivalent elements of the $TO_4$ tetrahedra, M represents an electropositive element of valence n, such as an alkali metal or alkaline earth metal, and represents the compensating cation, and x is a number which can range from 2 to theoretically infinity, in which case the zeolite is a silica.

Each type of zeolite has a distinct microporous structure. The change in the dimensions and forms of the micropores from one type to another involves changes in the adsorption properties. Only the molecules of certain dimensions and forms are capable of entering the pores of a particular zeolite. Due to these remarkable characteristic features, zeolites are very particularly suitable for the purification or separation of gaseous or liquid mixtures, such as, for example, the separation of hydrocarbons by selective adsorption.

The chemical composition, including in particular the nature of the elements present in the $TO_4$ tetrahedra and the nature of the exchangeable compensating cations, is likewise an important factor playing a role in the selectivity of adsorption and in particular in the catalytic properties of these products. They are used as catalysts or catalyst supports in cracking, reforming and modification of hydrocarbons as well as in the production of a large number of molecules.

Many zeolites occur in nature; they are aluminosilicates whose accessibilities and properties do not always meet the requirements of industrial applications. Accordingly, the search for products having novel properties has led to the synthesis of a wide range of zeolites, of which zeolite A (US-A 2,882,243), zeolite X (US-A 2,882,244), and zeolite Y (US-A 3,130,007) may be mentioned in particular.

The zeolites based on a gallosilicate skeleton are also quite numerous, and especially the gallium zeolite of the ZSM-5 type (EP-A 0,266,825), the gallium zeolite of the ZSM-11 type (EP-A 0,223,388) and certainly the gallium zeolites of the faujasite type (US-A 4,803,060 and US-A 3,431,219) may be mentioned in particular.

The zeolites from the structural class of faujasite are distinguished by a three-dimensional network structure, which can be described as an assembly of modules called cubic octahedra. Each of these modules is composed of 24 tetrahedra containing the elements Si and Ga in our case and bridged by oxygen according to the principle described above. In the cubic octahedron, the tetrahedra are linked such that eight rings of six tetrahedra and six rings of four tetrahedra are formed.

Each cubic octahedron is linked via four rings of six tetrahedra to four adjacent cubic octahedra in tetrahedral coordination.

In order to show the relationships which unite the different members of the structural family, it is appropriate to look at the structural planes in which the cubic octahedra are arranged at the vertices of a two-dimensional lattice of hexagons. In the structural plane, each cubic octahedron is also linked to three neighbors.

The fourth bonding direction extends alternately on both sides of the structural plane and allows the linkage of the cubic octahedra between adjacent and parallel structural planes.

All solids belonging to the structural class of faujasite have interconnected channels of about 0.8 nm in diameter. Thus, faujasite is a zeolite with an aluminosilicate skeleton, whose structure corresponds to the stacking of three distinct structural planes, ABC, which corresponds to a structure of cubic symmetry.

Compounds of the same structure as that of faujasite can be obtained by synthesis from a sodium gallosilicate gel. Reference may be made to US-A 3,431,219 and US-A 4,803,060 mentioned, previously which describe the synthesis of zeolites of the faujasite type, which have a gallosilicate skeleton whose Si/Ga ratio is between 1 and 3.

Higher Si/Ga ratios cannot be obtained by synthesis.

The general procedure for the synthesis of zeolites which have a gallosilicate skeleton and belong to the structural class of faujasite consists in hydrothermal crystallisation of sodium gallosilicate gels of specific composition comprising a structuring agent in the form of a metal cation.

More specifically, such a procedure consists first in preparing a reaction mixture having a pH of greater than 10 and comprising water, a source of tetravalent silicon, a source of trivalent gallium, a source of hydroxide ions in the form of a strong base, a source of metal cations $M^{n+}$, in which n is the valence of M, in order to obtain a gallosilicate gel having the desired composition for permitting its crystallisation in a compound of the structure class of faujasite, then in maintaining the gel obtained, directly or after preliminary ageing, at a temperature of at most equal to 150° C. and under a pressure of at least equal to the autogenous pressure of the mixture composed of said gel for a sufficient period to effect the crystallisation of this gel.

As mentioned above, such a process does not allow the synthesis of zeolites having a gallosilicate skeleton and the structure of cubic symmetry of faujasite and an Si/Ga ratio of greater than 3.

It has now been found that certain organic molecules belonging to the group of carbon-containing rings and macrocycles containing hetero atoms which are selected from oxygen, nitrogen and silicon, have the property of directing the crystallisation of gallosilicate gels towards zeolites of the structural class of faujasite, which are characterised by Si/Ga ratios which can be greater than 3. Irrespective of the size and symmetry of the ring or macrocycle, a zeolite is obtained having a cubic structure.

On the other hand, the ring or macrocycle provides an important stabilising effect, which makes it possible to reduce the hydroxide ion concentration in the synthetic medium, to the effect that a higher Si/Ga ratio and a substantial improvement in the yield can be obtained.

SUMMARY OF THE INVENTION

Accordingly, the invention relates to a process for the preparation of zeolites having a gallosilicate skeleton, belonging to the structural class of faujasite and having an Si/Ga ratio of greater than 1, which may exceed 3, the said process being of the type in which first a reaction mixture having a pH of greater than 10 and comprising water, a source of tetravalent silicon, a source of trivalent gallium, a source of hydroxide ions in the form of a strong base and a structuring agent ST is prepared in order to obtain a gallosilicate gel having the desired composition for permitting its crystallisation in a compound of the structural class of faujasite, then the gel obtained, if desired after preliminary ageing, is maintained at a temperature of at most equal to 150° C. and under a pressure of at least equal to the autogenous pressure of the mixture composed of said gel for a sufficient period to effect the crystallisation of this gel, giving a precursor of the zeolite including the zeolite trapping the structuring agent ST in its cavities, after which said precursor is subjected to calcination in order to destroy the structuring agent and produce the zeolite, characterised in that the structuring agent ST comprises at least one compound selected from carbon-containing rings and macrocycles whose ring comprises at least six atoms and contains hetero atoms selected from oxygen, nitrogen and silicon.

Advantageously, the amount of structuring agent ST present in the reaction mixture which serves for forming the gel is such that the molar ST:$Ga^{III}$ ratio ranges from 0.1 to 4, this ratio preferably ranging from 0.1 to 1 and most preferably from 0.2 to 0.5.

DETAILED DESCRIPTION OF THE INVENTION

In particular, the ingredients constituting the reaction mixture which gives rise to the gallosilicate gel are used such that said gel has the following composition in terms of molar ratios:

|  | Advantageous intervals | Preferred intervals |
| --- | --- | --- |
| $Si^{IV}$:$Ga^{III}$ | 2 to 20 | 4 to 10 |
| $OH^-$:$Ga^{III}$ | 2 to 12 | 3 to 10 |
| ST:$Ga^{III}$ | 0.1 to 4 | 0.1 to 1 |
| $H_2O$:$Ga^{III}$ | 40 to 200 | 50 to 150 |

The structuring agents ST which can be used in the process according to the invention can advantageously be selected from carbon-containing rings and macrocycles whose ring comprises at least six atoms and contains oxygen atoms as hetero atoms. The structuring agent preferably includes of one or more crown ethers whose ring comprises 12 to 18 atoms, of which the following compounds may be mentioned:

1,4,7,10-*tetraoxacyclododecane* ("12-*crown*-4"*crown ether*)

1,4,7,10,13-*pentaoxacyclopentadecane* ("15-*crown*-5"*crown ether*)

1,4,7,10,13,16-*hexaoxacyclooctadecane* ("18-*crown*-6"*crown ether*)

The use of structuring agents according to the invention results in the formation of zeolites having the structure of cubic symmetry of faujasite.

Of the sources of tetravalent silicon $Si^{IV}$ which can be used in the preparation of the reaction mixture which serves for forming the gallosilicate gel, solid silicas finely divided in the form of hydrogels, aerogels or colloidal suspensions, water-soluble silicates, such as alkali metal silicates, for example sodium silicate, hydrolysable silicic esters, such as tetraalkyl orthosilicates of the formula $Si(OR)_4$, in which R denotes $C_1$- to $C_4$-alkyl, such as methyl and ethyl.

The silicon source is used in the form of a true aqueous solution in the case of water-soluble silicates or an aqueous suspension, which may be colloidal, in the case of finely divided silicas.

Suitable sources of trivalent gallium $Ga^{III}$ are gallium salts, such as the sulfate, nitrate, chloride, fluoride, gallium oxides and hydroxyoxides, gallates and in particular alkali metal gallates, such as sodium gallate and various esters.

It is likewise possible to use sources containing the elements silicon and gallium in associated form, such as, for example, glasses or co-gels. The sources of the elements silicon and gallium can be used in the form of liquids or pulverulent solids but also in the form of agglomerates, such as, for example, pellets or extrudates which can be converted into zeolites without modifying their shape.

The source of hydroxide ions is selected from strong bases, advantageously inorganic bases, especially alkali metal hydroxides from group IA of the periodic table of the elements and hydroxides of the alkaline earth metals Ca, Sr and Ba; preference being given to sodium hydroxide.

The reaction mixture which serves for forming the gallosilicate gel can additionally comprise $M^{n+}$ cations of at least one metal M, of valence n, other than the metals whose hydroxides are strong bases, for example silver, in a total amount such that the molar $M^{n+}$:$Ga^{III}$ ratio is at most equal to 0.4 and preferably at most equal to 0.3. These cations $M^{n+}$ are introduced into the reaction mixture in the form of salts, such as sulphates, nitrates, chlorides or acetates or even in the form of oxides.

The mixing of the ingredients constituting the reaction mixture which serves for forming the gallosilicate gel can be carried out in any desired order.

Advantageously, this mixing is effected by first preparing an aqueous basic solution comprising a strong base, the structuring agent ST and the cations $M^{n+}$, if they are used, at ambient temperature, then incorporating into this solution an aqueous solution of the source of trivalent gallium and an aqueous solution or suspension, which may or may not be colloidal, of the source of tetravalent silicon. The pH of the reaction mixture, whose value is greater than 10, is preferably close to 13.5. Before carrying out the crystallisation of the gel, it is possible for crystallisation nuclei to be added to the reaction medium which serves for forming the said gel in an amount ranging advantageously from 0.1% to 10% by weight of the reaction medium.

The nuclei can be produced by grinding a gallium zeolite of the faujasite type, i.e. of the same nature as the crystalline phase to be prepared. If addition of nuclei does not take place, it is advantageous to subject the gallosilicate gel formed from the reaction mixture to ageing in a sealed vessel at a temperature below the crystallisation temperature for a period which may range from about 6 hours to about 6 days. This ageing may be carried out with or without stirring. The crystallisation of the gallosilicate gel, with or without nucleus, is carried out by heating the reaction mixture to a temperature of at least equal to 150° C. and preferably in the range from 90° C. to 120° C. and under a pressure corresponding at least to the autogenous pressure of the reaction mixture forming the gel. The heating time necessary for crystallisation depends on the composition of the gel and the crystallisation temperature. It is in general between 2 hours and 20 days.

The crystals obtained, which are designated zeolite precursors and consist of the zeolite trapping the structuring agent and the water of hydration of the cations in its pores and cavities, are separated from the crystallisation medium by filtration, then washed with distilled or deionised water until the wash water obtained is slightly basic, i.e. its pH is less than 9. The washed crystals are then dried in an oven at a temperature between 50° C. and 100° C. and preferably around 70° C.

The zeolite is obtained from the crystals of the precursor by subjecting said crystals to calcination at a temperature above 300° C. and preferably between 400° C. and 700° C. for a sufficient period in order to remove the structuring agent and the water of hydration of the cations contained in the precursor.

As mentioned above, the zeolites prepared by the process according to the invention have Si/Ga ratios of greater than 1, which may exceed 3, and have the structure of cubic symmetry of the faujasite type.

The products according to the invention, i.e. the precursors originating from the crystallisation and the actual zeolites resulting from the calcination of the precursors, can be characterised by using the following techniques:

Electron microscopy:

Under an electron microscope, the products of cubic structure can be seen in forms compatible with cubic symmetry (for example regular octahedra).

X-ray diffraction diagram:

This diffraction diagram is obtained by means of a diffractometer using the conventional powder method with copper $K\alpha$ radiation.

Internal calibration allows accurate determination of the values of the $2\theta$ angles which are associated with the diffraction peaks. The different interplanar spacings ($d_{hkl}$), which are a characteristic feature of the sample, are calculated from the BRAGG relationship.

The experimental error $\Delta(d_{hkl}k)$ of $d_{hkl}$ is estimated by the BRAGG relationship as a function of the absolute error $\Delta(2\theta)$ of the measurement of $2\theta$.

In the presence of internal calibration, this error is minimised and currently taken to be equal to $\pm 0.05°$. The relative intensity $I/Io$ of each $d_{hkl}$ is estimated from the height of the corresponding diffraction peak. A series of symbols is used to characterise this relative intensity, namely: vs=very strong, s=strong, ms=medium strong, m=medium, mw=medium weak, w=weak, vw=very weak.

Thermogram:

The thermograms carried out with samples of the products allow the determination of the number of molecules of structuring agent and the number of water molecules contained in one measure of the structure.

Carbon 13 NMR:

Cross-polarised carbon 13 NMR with magic angle rotation carried out with the samples of the precursor allows confirmation of the presence of the structuring agent in the cavities of the product.

Determination of the Si:Ga ratio

This can be carried out by using one of the following techniques:
chemical analysis
silicon 29 NMR The zeolites according to the invention of the faujasite type have a cubic structure in which the value of the parameter a of the cubic lattice unit is between 2.4 and 2.55 nm, so that these cubic zeolites can be given the following formula, relative to one lattice unit (assembly of 192 tetrahedra).

$$(v\ M_1{}^{1+})\ (w\ M^{n+})[(SiO_2)_{192-x}(GaO_2)_x]^{x-},(zH_2O)$$

where $M_l{}^{1+}$ in this formula denotes a q-valent cation of a metal from group I A of the periodic table of the elements (q=1) or of an alkaline earth metal selected from Ca, Sr and Ba (q=2) or a monovalent cation including nitrogen (q=1), especially ammonium or quaternary ammonium, $M^{n+}$ representing a metal cation of valence n other than an $M_l{}^{1+}$ cation, x, z, w and v being numbers such that $38 < x \leq 96$, $z \geq 0$, depending on the degree of hydration of the zeolite (z0 for a completely anhydrous zeolite), $$9 < v \leq x/q \text{ and } 0 \leq w \leq x/n \text{ where } qv + wn \geq x.$$

Table I below shows the characteristic X-ray diffraction diagram of cubic zeolites of the faujasite type after calcination of the products at 500° C. for 4 hours.

In the column under $d_{hkl}$, the average values of the interplanar spacings have been given. For each of these values, an experimental error $\Delta(d_{hkl})$ between $\pm 0.1$ and $\pm 0.004$ must be indicated.

The variations which can be observed with respect to these average values are essentially linked to the nature of the compensating cations and the Si/Ga ratio of the zeolite. The same remarks also apply to the relative intensities I/Io.

TABLE I

| $2\theta$ (degrees) | $d_{hkl}$ ($10^{-1}$ nm) | I/Io |
|---|---|---|
| 6.17 | 14.30 ±0.1 | vs |
| 10.08 | 8.77 | ms |
| 11.86 | 7.46 | ms |
| 15.62 | 5.67 ±0.025 | s |
| 18.64 | 4.756 | ms |
| 20.29 | 4.373 | ms |
| 22.72 | 3.912 | w |
| 23.57 | 3.770 | s |
| 24.96 | 3.564 | vw |
| 25.72 | 3.462 | w |
| 26.94 | 3.308 | s |
| 27.69 | 3.219 ±0.004 | w |
| 29.52 | 3.024 | mw |
| 30.61 | 2.919 | ms |

The zeolite precursors formed during the crystallisation step of the process according to the invention and the calcination of which leads to zeolites whose formulae have been defined above are crystalline gallosilicates having an Si:Ga ratio of greater than 1, which may exceed 3, and the cubic structure of faujasite in accordance with the X-ray diffraction diagram, which is comparable to that given in Table II, which zeolites have cavities trapping molecules of the structuring agent ST, which are carbon-containing rings or macrocycles whose ring comprises at least six atoms and contains hetero atoms selected from oxygen, nitrogen and silicon.

TABLE II

| 2θ (degrees) | $d_{hkl}$ ($10^{-1}$ nm) | $I/I_0$ |
| --- | --- | --- |
| 6.20 | 14.24 ±0.1 | vs |
| 10.09 | 8.76 | ms |
| 11.89 | 7.44 | s |
| 15.64 | 5.66 ±0.025 | s |
| 18.69 | 4.745 | m |
| 20.32 | 4.366 | ms |
| 22.75 | 3.904 | w |
| 23.61 | 3.764 | ms |
| 24.99 | 3.560 | vw |
| 25.72 | 3.461 | w |
| 26.95 | 3.303 | s |
| 27.72 | 3.215 ±0.004 | vw |
| 29.545 | 3.021 | mw |
| 30.645 | 2.915 | mw |

The precursors having the structure of cubic symmetry of faujasite can be represented by a formula which, relative to one lattice unit of the cubic structure, can be written as follows

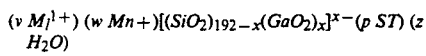

$$(v\, M_l^{1+})\, (w\, M^{n+})[(SiO_2)_{192-x}(GaO_2)_x]^{x-}\,(p\, ST)\, (z\, H_2O)$$

in which $M_l^{1+}$, $M^{n+}$, x, v, w and z have the meanings given above, p is a number such that $6 < p < 10$ and ST represents at least one carbon-containing ring or macrocycle whose ring comprises at least six atoms and contains hetero atoms chosen from oxygen, nitrogen and silicon.

The rings and macrocycles from which the structuring agent ST is selected are advantageously carbon-containing rings and macrocycles whose ring comprises at least six atoms and contains oxygen atoms as hetero atoms.

In particular, said structuring agent includes one or more crown ethers whose ring comprises 12 to 18 atoms and contains at least 4 oxygen atoms.

The zeolites obtained by the process according to the invention can be used in the same types of application as the zeolites of similar structure and of comparable or lower Si:Ga ratio prepared by analogous or different methods.

Thus, the zeolites obtained according to the invention are suitable as adsorbants for effecting selective adsorption of molecules whose dimensions are smaller than 0.8 nm or else, after being subjected to exchange reactions with various cations, as catalysts or components of catalysts which can be used in catalytic conversion reactions of organic compounds and especially of hydrocarbon compounds. For example, the protonated form of the zeolite can be obtained by a treatment of exchange with ammonium cations followed by calcination. This form as well as those resulting from a treatment of exchange with rare earth cations, such as lanthanum, are suitable as acid catalysts for the hydrocracking of petroleum charges. The zeolites can likewise be subjected to treatments of exchange with metal cations from groups II to VIII of the periodic table in order to form products which are suitable as catalysts for the conversion of hydrocarbons. For their applications as catalysts, the zeolites modified by exchange with cations which give them catalytic properties can be used by themselves or in the form of composite products resulting from mixing these modified zeolites with other catalytically active products and/or with an amorphous matrix, such as a silica gel or else a mixed gel of silica and another oxide, such as magnesia, alumina, titanium oxide, zirconium oxide, in which said matrix serves, inter alia, to give the catalyst a better heat stability. The composite catalysts in which one or more catalytically active zeolites are associated with a matrix based on silica gel or a mixed gel of silica and another oxide are particularly suitable for fluid bed or fluidised bed operations, since they can easily be processed to give particles having the requisite dimensions for these operations, for example by spray drying of an aqueous suspension of the ingredients of which the catalysts are made up.

The examples which follow are given by way of non-limiting illustration of the invention.

In these examples, amounts and percentages are given by weight, unless stated otherwise.

EXAMPLE 1

A gallosilicate gel was prepared by the following procedure in a vessel of suitable capacity, with continuous stirring of the contents of said vessel during the entire duration of the operation. 4.5 parts of water, 0.65 part of sodium hydroxide NaOH and, after dissolution of the sodium hydroxide, 0.7 part of crown ether "18-crown-6" were introduced into the vessel. After complete dissolution of the crown ether, 0.5 part of gallium oxide was then added to the contents of the vessel, and the reaction mixture was gently heated in order to dissolve the gallium oxide completely. After ambient temperature had been reached again, 4 parts of a colloidal silica suspension comprising 40% of $SiO_2$ and 60% of water were then introduced into the vessel.

This gave a gallosilicate gel whose molar composition, relative to one mol of $Ga_2O_3$, was as follows: 10 $SiO_2$; 1 $Ga_2O_3$; 3.0 NaO; 1 crown ether; 140 $H_2O$.

The gel obtained was subjected to ageing at ambient temperature for 24 hours in a sealed vessel.

The aged gel was then placed in an autoclave and maintained at 100° C. in the latter for 144 hours in order to form a crystallised product. The crystals were separated from the reaction medium by filtration, then washed with distilled water until the wash water was weakly basic (pH of less than 9) and finally dried at about 60° C. in an oven.

The dried crystals were then calcined at 400° C. for 4 hours so as to remove the crown ether molecules used as structuring agent and to obtain the zeolite.

Before calcination, the crystallised product has an X-ray diffraction diagram which is comparable to that given in Table II.

The formula found for this product, relative to one lattice unit of the structure, which is of cubic symmetry, can be written as

$$45.2\, Na^+\, [(SiO_2)_{146.9}\, (GaO_2)_{45.1}]^{45.1-}\, 7("18\text{-crown-}6")135H_2O$$

The zeolite formed by calcination of the above product has an X-ray diffraction diagram which is comparable to that of Table I, which is characteristic of calcined cubic faujasites.

The formula found for this zeolite, relative to one lattice unit of the cubic structure, can be written in its anhydrous state as

$$45.2\, Na^+\, [(SiO_2)_{146.9}\, (GaO_2)_{45.1}]^{45.1-}$$

A very slight excess of positive charge with respect to neutrality is observed.

About 65% of the silica put into the operation shows up in the zeolite.

EXAMPLE 2

The procedure indicated in Example 1 was repeated, except that the following changes in the process conditions were made:
preparation of the gel:
  0.5 part of sodium hydroxide,
  0.45 part of gallium oxide
ageing: 20° C. for 24 hours
crystallisation: 110° C. for 360 hours
calcination: 500° C. for 6 hours.

Before ageing, the gallosilicate gel had the following molar composition relative to 1 mol of $Ga_2O_3$.

11 $SiO_2$; 1 $Ga_2O_3$; 3.0 $Na_2O$; 1 (18-crown-6); 155 $H_2O$

Before calcination, the crystallised product has an X-ray diffraction diagram which is comparable to that given in Table II.

The formula found for said product, relative to one lattice unit of the structure, which is of cubic symmetry, can be written as $$43.5\ Na^+\ [(SiO_2)_{148.7}\ (GaO_2)_{43.3}]^{43.3-}\ 7.2(18\text{-crown-}6)133H_2O$$

The zeolite formed by calcination of the above product has an X-ray diffraction diagram which is comparable to that of Table I.

The formula found for this zeolite, relative to one lattice unit of the hexagonal structure, can be written in the anhydrous state as $$43.5\ Na^+\ [(SiO_2)_{148.7}(GaO_2)_{43.3}]^{43.3-}$$

About 70% of the silica put into the operation shows up in the zeolite skeleton.

EXAMPLE 3

The procedure indicated in Example 1 was repeated, except that the following changes in the process conditions were made:
preparation of the gel: 1 part of crown ether "15-crown-5" and 0.7 part of sodium hydroxide NaOH
ageing: 20° C. for 24 hours
crystallisation: 115° C.
calcination: 400° C. for 4 hours Before ageing, the gallosilicate gel had the following molar composition, relative to 1 mol of $Ga_2O_3$: 10 $SiO_2$; 1 $Ga_2O_3$; 3.3 $Na_2O$; 1.7 "15-crown-5", 140 $H_2O$ Before calcination, the crystallised product has an X-ray diffraction diagram which is comparable to that given in Table II.

The formula found for said product, relative to one lattice unit of the structure, which is of cubic symmetry, can be written as $$50.8\ Na^+\ [(SiO_2)_{141.3}\ (GaO_2)_{50.7}]^{50.7-}\ 8.2(\text{"15-crown-5"})139H_2O$$

The zeolite formed by calcination of the above product has an X-ray diffraction diagram which is comparable to that of Table I.

The formula found for this zeolite, relative to one lattice unit of the cubic structure, can be written in the anhydrous state as $$50.8\ Na^+\ [(SiO_2)_{141.3}\ (GaO_2)_{50.7}]^{50.7-}$$

About 65% of the silica put into the operation shows up in the zeolite skeleton.

EXAMPLE 4

The procedure indicated in Example 1 was repeated, except that the following changes in the process conditions were made:
preparation of the gel:
  0.5 part of crown ether "15-crown-5" and
  0.5 part of crown ether "18-crown-6"
  0.65 part of sodium hydroxide NaOH
ageing: 25° C. for 24 hours
crystallisation: 110° C. for 168 hours
calcination: 450° C. for 4 hours.

Before ageing, the gallosilicate gel had the following molar composition, relative to 1 mol of $Ga_2O_3$: 10 $SiO_2$; 1 $Ga_2O_3$; 3.0 $Na_2O$; 0.7 ("18-crown-6"); 0.85 ("15-crown-5"); 140 $H_2O$ Before calcination, the crystallised product has an X-ray diffraction diagram which is comparable to that given in Table II. The formula found for said product, relative to one lattice unit of the structure, which is of cubic symmetry, can be written as $$46.7\ Na^+[(SiO_2)_{145.5}\ (GaO_2)_{46.5}]^{46.5-}\ \begin{pmatrix}4.3(\text{"15-crown-5"})\\4.1(\text{"18-crown-6"})\end{pmatrix}134H_2O$$

The zeolite formed by calcination of the above product has an X-ray diffraction diagram which is comparable to that of Table I, which is characteristic of calcined cubic faujasites.

The formula found for this zeolite, relative to one lattice unit of the cubic structure, can be written in the anhydrous state as $$46.7\ Na^+\ [(SiO_2)_{145.5}\ (GaO_2)_{46.5}]^{46.5-}$$

We claim:

1. A process for the preparation of zeolites having a gallosilicate skeleton, belonging to the structural class of faujasite and having an Si:Ga ratio greater than 1, said process comprising first preparing a reaction mixture gel having a pH of greater than 10 and comprising water, a source of tetravalent silicon, a source of trivalent gallium, a source of hydroxyl ions in the form of a strong base and a structuring agent ST; then maintaining said gel at a temperature of at most equal to 150° C. and under a pressure of said gel for a sufficient period of time to effect the crystallisation of this gel into a precursor of the faujasite zeolite wherein said precursor contains the structuring agent ST in its cavities; after which said precursor is subjected to calcination in order to destroy said structuring agent ST and produce the zeolite; further characterized in that the structuring agent ST comprises at least one compound selected from the group consisting of carbon-containing ringed compounds and macrocyclic compounds whose ring comprises at least six atoms and contains heteroatoms selected from the group consisting oxygen, nitrogen and silicon.

2. Process according to claim 1, wherein the amount of the structuring agent ST in the reaction mixture which forms the gel is such that the molar $ST:Ga^{III}$ ratio is from 0.1 to 4.

3. Process according to claim 2, wherein the molar $ST:Ga^{III}$ ratio is from 0.1 to 1.0.

4. Process according to claim 1, wherein the gel has the following molar ratios, $Si^{IV}:Ga^{III}$ of from 2 to 20, OH:Ga$^{III}$ of from 2 to 12, ST:Ga$^{III}$ of from 0.1 to 4 and H$_2$O:Ga$^{III}$ of from 40 to 200.

5. Process according to claim 1, wherein the gel has the following molar ratios Si$^{IV}$:Ga$^{III}$ of from 4 to 10, OH:Ga$^{III}$ of from 3 to 10, ST:Ga$^{III}$ of from 0.1 to 1 and H$_2$O:Ga$^{III}$ of from 50 to 150.

6. Process according to claim 5, wherein the structuring agent ST is selected from the group consisting of carbon-containing rings and macrocycles whose ring comprises at least 6 atoms and contains oxygen atoms as heteroatoms.

7. Process according to claim 1, wherein the structuring agent is at least one compound selected from crown ethers whose ring comprises 12 to 18 atoms and contains at least 4 oxygen atoms.

8. Process according to claim 7, wherein the source of tetravalent silicon is selected from the group consisting of silicas finely divided in the form of hydrogels, aerogels or colloidal suspensions, water-soluble silicates, and hydrolyzable silicic esters.

9. Process according to claim 1, wherein the source of tetravalent silicon is selected from the group consisting of alkali metal silicates and tetraalkyl orthosilicates of the formula Si (OR)$_4$ in which R is a C$_1$-C$_4$ alkyl radical.

10. Process according to claim 9, wherein the source of trivalent gallium is selected from the group consisting of gallium salts, gallium oxides and hydroxy oxides, gallates, gallium esters, glasses and co-gels of silicon and gallium.

11. Process according to claim 10, wherein the source of trivalent gallium is alkali metal gallates.

12. Process according to claim 1, wherein the source of hydroxide ions is selected from the group consisting of alkali metal hydroxides and alkaline earth metal hydroxides.

13. Process according to claim 1, wherein the reaction mixture comprises M$^{n+}$ cations of at least one metal M, of valence n, other than the metals whose hydroxides form strong bases in a total amount such that the molar M$^{n+}$:Ga$^{III}$ ratio in said mixture is at most equal to 0.4.

14. Process according to claim 1, further comprising adding crystallization nuclei to the reaction mixture in an amount of from 0.1% to 10% by weight of said reaction mixture.

15. Process according to claim 14, wherein crystallization nuclei are produced by grinding a gallium of the same type of said zeolites having a gallosilicate skeleton.

16. Process according to claim 1, further comprising aging said gel in a sealed vessel at a temperature below the crystallization temperature for a period of from about 6 hours to about 6 days.

17. Process according to claim 1, further comprising maintaining said gel at a temperature ranging from 90° C. to 120° C. for a time between 2 hours and 20 days.

18. Process according to claim 1, wherein the step of calcining the zeolite precursor is carried out at a temperature above 300° C.

19. Process according to claim 18, wherein the step of calcining the zeolite precursor is carried out at a temperature of from about 400° to 700° C.

20. Process according to claim 1, wherein the Si:Ga ratio is greater than 3.

21. Precursors produced by the process of claim 1.

22. Precursors according to claim 21, wherein the molecules of the structuring agent ST are selected from the group formed by crown ethers whose ring comprises 12 to 18 atoms and contains at least 4 oxygen atoms.

23. Precursors according to claim 21, having a X-ray diffraction pattern comparable to that shown in the table below

| 2θ (degrees) | d$_{hkl}$ (10$^{-1}$ nm) | I/Io |
|---|---|---|
| 6.20 | 14.24 ±0.1 | vs |
| 10.09 | 8.76 | ms |
| 11.89 | 7.44 | s |
| 15.64 | 5.66 ±0.025 | s |
| 18.69 | 4.745 | m |
| 20.32 | 4.366 | ms |
| 22.75 | 3.904 | w |
| 23.61 | 3.764 | ms |
| 24.99 | 3.560 | vw |
| 25.72 | 3.461 | w |
| 26.95 | 3.303 | s |
| 27.72 | 3.215 ±0.004 | vw |
| 29.545 | 3.021 | mw |
| 30.645 | 2.915 | mw | and are represented by a formula which, relative to one lattice unit of the cubic structure, is shown below

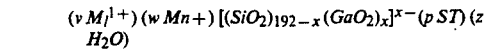

$$(v M_1^+)(w Mn+) [(SiO_2)_{192-x}(GaO_2)_x]^{x-}(p ST)(z H_2O)$$

in which M$_1$$^{q+}$ denotes a q-valent cation of a metal from group IA of the periodic table (q=1) or of an alkaline earth metal selected from Ca, Sr and Ba (q=2) or a monovalent cation including nitrogen (q=1), m$^{n+}$ represents a cation of at least one metal M of valence n other than an M$_1$$^{q+}$ cation, x, z, v and w are numbers, such that 38 < x ≤ 96, z ≥ 0 and depending on the degree of hydration of the precursor, $$0 \leq v < x/q \text{ and } 0 \leq w \leq x \text{ where } qv + wn \geq x,$$

p is a number such that 6 < p < 10 and ST represents the structuring agent.

24. Zeolite precursors having a gallosilicate skeleton and belonging to the structural class of faujasite and comprising gallosilicates having an Si:Ga ratio of greater than 1 and having a structure of cubic symmetry which is comparable to that of faujasite and cavities or channels adapted to trap molecules of at least one structuring agent ST wherein said structuring agent comprises at least one compound selected from the group consisting of carbon-containing ringed compounds and macrocyclic compounds whose ring comprises at least six atoms and contains heteroatoms selected from the group consisting of oxygen, nitrogen and silicon.

25. A process for the preparation of precursors of zeolites having a gallosilicate skeleton, belonging to the structural class faujasite and having an Si:Ga ratio greater than 1, said process comprising first preparing a reaction mixture gel having a pH greater than 10 and trivalent gallium, a source of hydroxide ions in the form of a strong base and a structuring agent ST; then maintaining said gel at a temperature not exceeding 150° C. and under a pressure at least equal to the autogenous pressure of said gel for a sufficient period of time to effect the crystallization of the gel into a precursor of the faujasite wherein said precursor zeolite contains the structuring agent ST in its cavities compriing at least on compound selected from the group consisting of carbon-containing ringed compounds and macrocyclic compounds whose rings comprise at least 6 atoms and contain heteroatoms selected from the group consisting of oxygen nitrogen and silicon.

26. The process according to claim 25, wherein the quantity of structuring agent ST in the reaction mixture intended to form the gel is such as to make the molar ratio ST:$Ga^{III}$ ranging from 0.1 to 4.

27. The process according to claim 25, wherein the ingredients making up the reaction mixture giving rise to the gallosilicate gel are employed in such quantities as to give said gel, in term of molar ratios, a composition such that $Si^{IV}$:$Ga^{III}$=2 to 20, OH:$Ga^{III}$≦2 to 12, ST:$Ga^{III}$=2 to 20 and $H_2O$:$Ga^{III}$=40 to 200.

28. The process according to claim 25, wherein the structuring agent ST is comprised of at least one crown ether whose ring contains 12 to 18 atoms.

29. The process according to claim 25, wherein the source of tetravalent silicon is selected from the group consisting of finely divided silicas in the form of hydrogens, aerogels or colloidal suspensions, water-soluble silicates and hydrolysable silicic esters.

30. The process according to claim 25, wherein the source of trivalent gallium is selected from the group consisting of gallium salts, gallium oxides and hydroxides and gallium esters.

31. The process according to claim 25, wherein the source of hydroxide ions is selected from the group consisting of hydroxides of the alkali metals of group IA of the Periodic Classification of the Elements and hydroxides of the alkaline-earth metals Ca, St and Ba.

32. The process according to claim 25, wherein the reaction mixture contains cations $M^{n+}$ of at least one metal M, of valency n, other than the metals whose hydroxides are strong bases, in an overall quantity such as to make the molar ratio $M^{n+}$:$Ga^{III}$ in said mixture does not exceed 0.4.

33. The process according to claim 25, wherein before proceeding to crystalline the gel, crystallization nuclei are added to the reaction mixture intended to from said gel, in a quantity ranging from 0.1% to 10% by weight of said reaction mixture.

34. The process according to claim 25, wherein before proceeding to crystallize the gal, said gel is subjected to a maturing operation, in a closed vessel, at a temperature below the crystallization temperature from a period ranging from approximately 6 hours to approximately 6 days.

35. The process according to claim 25, wherein the crystallization of the aluminosilicate gel, with or without seed, is carried out by keeping said gel at a temperature ranging from 90° C. to 120° C. for a period of between 2 hours and 20 days.

* * * * *

UNITED STATES PATENT AND TRADEMARK OFFICE
CERTIFICATE OF CORRECTION

PATENT NO. : 5,158,757
DATED     : October 27, 1992
INVENTOR(S) : Francois Delprato, et. al.

It is certified that error appears in the above-indentified patent and that said Letters Patent is hereby corrected as shown below:

On the Title page, item [75], the last name of the inventor should read--Delprato--.

Signed and Sealed this

Nineteenth Day of October, 1993

Attest:

BRUCE LEHMAN

Attesting Officer
Commissioner of Patents and Trademarks